US010718102B2

(12) United States Patent
Huang et al.

(10) Patent No.: US 10,718,102 B2
(45) Date of Patent: Jul. 21, 2020

(54) DISCHARGE COLD SWITCHING VALVE AND ITS SWITCHING METHOD (71) Applicant: XIAMEN SOLEX HIGH-TECH INDUSTRIES CO., LTD., Xiamen, Fujian (CN)

(72) Inventors: Xi Huang, Fujian (CN); Donghai Chen, Fujian (CN); Mingfu Zhang, Fujian (CN); Wenxing Chen, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 11 days.

(21) Appl. No.: 15/925,061

(22) Filed: Mar. 19, 2018

(65) Prior Publication Data
US 2019/0055718 A1 Feb. 21, 2019

(30) Foreign Application Priority Data

Aug. 15, 2017 (CN) .......................... 2017 1 0697127

(51) Int. Cl.
*E03B 7/04* (2006.01)
*F16K 15/02* (2006.01)
(Continued)

(52) U.S. Cl.
CPC ............ *E03B 7/045* (2013.01); *E03C 1/0408* (2013.01); *F16K 5/0407* (2013.01);
(Continued)

(58) Field of Classification Search
CPC ............... E03B 7/045; Y10T 137/7724; Y10T 137/7737; E03C 1/0408; F16K 5/0407;
(Continued)

(56) References Cited

U.S. PATENT DOCUMENTS 4,854,499 A * 8/1989 Neuman ................... E03C 1/04
236/93 B
5,368,227 A * 11/1994 McGinnis ............ G05D 23/123
236/92 R
(Continued)

FOREIGN PATENT DOCUMENTS

CN 205260926 U 5/2016
EP 3406807 A1 * 11/2018 ............. E03C 1/041

OTHER PUBLICATIONS

Machine Translation of CN20526092 retrieved Nov. 2019 (Year: 2019).*

*Primary Examiner* — Jessica Cahill
(74) *Attorney, Agent, or Firm* — Cooper Legal Group, LLC (57) ABSTRACT

A switching valve for discharging cold water includes: an operating member, a first switching member, and a water outlet switching member. The switching valve for discharging cold water has a cold water discharging passage and a head water outflow passage. When the operating member is in the initial position, the switching valve for discharging cold water is in the first position, the joint between the head water outflow passage and the water inlet end is sealed, the cold water discharging passage opens; when the operating member switches to the shower position, the first switching member is moved by the operating member to the second position, a second joint between the cold water discharging passage and the water inlet end is sealed, and the head water outflow passage opens, engaging the operating member with the water outlet switching member. The operating member drives the water outlet switching member to open one or both of the first and second water outlet passages.

12 Claims, 5 Drawing Sheets

(51) Int. Cl.
*F16K 31/00* (2006.01)
*F16K 5/04* (2006.01)
*E03C 1/04* (2006.01)
*F16K 11/044* (2006.01)
*F16K 11/22* (2006.01)
*F16K 3/26* (2006.01)

(52) U.S. Cl.
CPC ........ *F16K 11/0445* (2013.01); *F16K 15/026* (2013.01); *F16K 31/002* (2013.01); *F16K 3/267* (2013.01); *F16K 11/22* (2013.01)

(58) Field of Classification Search
CPC .. F16K 11/0445; F16K 15/026; F16K 31/002; F16K 3/267; F16K 11/22
See application file for complete search history.

(56) References Cited

U.S. PATENT DOCUMENTS

| | | | |
|---|---|---|---|
| 9,309,984 B2 * | 4/2016 | Cutler | F16K 31/002 |
| 2007/0194141 A1 * | 8/2007 | Brown | E03C 1/0408 |
| | | | 236/93 A |
| 2007/0290058 A1 * | 12/2007 | Guterman | E03C 1/041 |
| | | | 236/93 R |
| 2008/0072971 A1 * | 3/2008 | Honeychurch | E03B 1/04 |
| | | | 137/468 |
| 2015/0075631 A1 * | 3/2015 | Romero | E03B 1/048 |
| | | | 137/13 |
| 2016/0201304 A1 * | 7/2016 | Doss | E03C 1/023 |
| | | | 137/15.01 |
| 2017/0191248 A1 * | 7/2017 | Lin | E03B 1/048 |
| 2018/0038502 A1 * | 2/2018 | Tallos | F16K 31/002 |
| 2019/0277011 A1 * | 9/2019 | Doss | E03C 1/0408 |

* cited by examiner

DISCHARGE COLD SWITCHING VALVE AND ITS SWITCHING METHOD

TECHNICAL FIELD

The present invention relates to a water discharge device, and more particularly to a switching valve.

BACKGROUND TECHNIQUE when people are in the shower, especially in the winter, it needs to firstly drain the cold water in the water pipe, until there is warm water out, then begin the shower, the traditional way of discharge cold are manually controlled way, that is, the valve is been switched to the warm water state until the cold water in the water row finished, and in some areas even it take a few minutes to discharge cold water, in this discharge cold method it needs to touch and feel the water temperature, need to waste time specifically for waiting, or the people will be frozen to cold water, if not guarding nearly, there may be a waste of hot water resources.

The utility model patent 201521135958.8 discloses a switching valve having a discharge cold function, which is provided with a discharge passage for controlling the communication between the head water outflow passage and the discharge cold passage so that the residual cold water in the head water outflow passage can be discharged from the discharge cold passage; the discharge cold passage is closed when the water is discharged normally. In order to achieve this technical effect, the head water outflow passage and the discharge cold passage are opened and closed by a one-way valve and a reset spring. First of all, because the one-way valve is in the normally closed state, when discharging cold, it needs a certain suction to open the one-way valve, the required suction must be able to overcome the spring force and one-way valve and Y-ring friction; secondly, when discharging cold, the venturi effect is used, the resulting suction is parallel to the direction of one-way valve movement, but the cross-sectional area difference is very small, that is, the action area on the one-way valve corresponding to the suction is small, so the downward force on the one-way valve by is also very small, when the pressure is less than a certain value, it simply can not open the one-way valve, and can not discharge the cold water of the top spray water; so that the flow area of the cooling section is very small, the flow is very small, greatly extending the time of the discharging cold; In addition, in the process of using the hand shower, once the hand shower is with a small flow of water or water stop function, resulting in increased pressure inside the discharging cold channel, the water flowing through the hand shower from the suction hole to the top spray, so that top spray water spills, so the whole structure is not reliable.

THE CONTENTS OF THE INVENTION

The main technical problem to be solved by the present invention is to provide a switching valve which functions water way switching and closing water and discharging cold water.

Another major technical problem to be solved by the present invention is to provide a switching method of the switching valve for discharging cold water. The two different functions of the discharge cold switching and water outlet switching are respectively carried out by two different actions, and the directivity is better.

In order to solve the above-mentioned technical problems, the present invention provides a switching valve for discharging cold water, comprising: an operating member, a first switching member for discharging cold water, a water outlet switching member;

the switching valve for discharging cold water has a cold water discharging passage, a head water outflow passage, a first water outlet passage communicating with the head water outflow passage and a second water outlet passage communicating with the head water outflow passage; and when the operating member is in the initial position, the first switching member is located at the first position, the joint between the head water outflow passage and the water inlet end is sealed by the first switching member, the cold water discharging passage is opened; when the operating member is switched to the use position, the first switching member is moved by the operating member to the second position, the joint between the cold water discharging passage and the water inlet end are sealed by the first switching member, and the head water outflow passage is opened;

when the head water outflow passage is opened, the operating member is engaged with the water outlet switching member, and the operating member is further operated to drive the movement of the water outlet switching member so that one or both of the first water outlet passage and the second water outlet passage are opened.

In a preferred embodiment, after the operating member is moved from the initial position to the use position, the operating member can be reset to the initial position and is engaged with the water outlet switching member; when the operating member is reset to the initial position, the discharge cold member is held in the second position by the action of the water pressure of the head water outflow passage.

In a preferred embodiment, said discharge cold member is a switching shaft, one end of the switching shaft is engaged with the operating member in one way and the other end of the switching shaft abuts the first reset member; and the circumference of the switching shaft is provided with a first seal ring, and the operating member drives the switching shaft to move from the first position to the second position along its own axial direction.

In a preferred embodiment, the joint between the cold water discharging passage and the water outlet end and the joint between the water cold water discharging passage and the water inlet end are located on the right side and the left side of the water inlet end, respectively; the first seal ring is located on the left side of the inlet end when the shaft is in the first position and the first seal ring is translated to the right side of the inlet end when the switching shaft is in the second position.

In a preferred embodiment, further comprising a discharge cold closing member, which including a water stopping column and a temperature sensor provided in the cold water discharging passage, the telescopic end of the temperature sensor is engaged with the water stopping column, and when the hot water flows through the cold water discharging passage, the telescopic end of the temperature sensor is extended to drive the water stopping column to move; the second seal ring provided on the water stopping column seals the cold water discharging passage.

In a preferred embodiment, said water stopping column is provided with a pressure relief hole in the direction of the water flow; when the water stopping column seals the cold water discharging passage, the water in the cold water discharging passage flows out of the cold water discharging passage through the pressure relief hole.

In a preferred embodiment, when head water outflow passage is opened, the operating member and the water outlet switching member are rotatably connected.

In a preferred embodiment, said water outlet switching member is a valve rod, the side wall of which is provided a third seal block, said head water outflow passage is respectively connected to the second water outlet passage and the first water outlet passage; the operating member drives the valve rod to rotate axially around the valve rod, and when the third seal block is rotated to the joint between the head water outflow passage and the second water outlet passage or the first water outlet passage, the corresponding water outlet passage is blocked;

and when the third seal block is rotated to another position, the second water outlet passage and the first water outlet passage are simultaneously opened.

In a preferred embodiment, said operating member is a spinning button, the first switching member is engaged to the spinning button in a pressing direction; the water outlet switching member is rotatably connected to the spinning button.

In a preferred embodiment, said discharge cold switching is provided with a positioning pin, the water outlet switching member is provided with a first positioning groove and a second positioning groove in the pressing direction, respectively; and the positioning pin is moved from the first positioning groove to the second positioning groove when the spinning button is pressed, and the spinning button drives the water outlet switching member to rotate, and the positioning pin is located in the first positioning groove.

In a preferred embodiment, said second positioning grooves are continuously distributed along the circumferential direction of the water outlet switching member; there are three the first positioning grooves arranged along the circumferential intervals of the water outlet switching member; and the second water outlet passage is opened or the first water outlet passage is opened or the second water outlet passage and the first water outlet passage are simultaneously opened when the positioning pin is engaged with the different first positioning groove.

The present invention also provides a switching valve for discharging cold water, comprising: an operating member, a first switching member, a water outlet switching member; the switching valve for discharging cold water has a cold water discharging passage, a head water outflow passage, a first water outlet passage communicating with the head water outflow passage and a second water outlet passage communicating with the head water outflow passage; the operating member is connected with both the first switching member and the water outlet switching member, and pressing the operating member can drive to the first switching member to move from the discharge cold position to the shower position; the rotating the operating member can drive the water outlet switching member to rotate so that one or both of the first water outlet passage and the second water outlet passage are opened.

The present invention also provides a switching valve for discharging cold water, comprising: the operating member of the switching valve for discharging cold water has a degree of freedom of movement in two non-reciprocating directions, and when the operating member is moved in the first direction, the switching valve for discharging cold water is switched from a discharge cold state to an outlet state; when the switching valve for discharging cold water is in the water outlet state, the operating member is moved in the second direction, one or both of the first water outlet passage and the second outlet passage in switching valve for discharging cold water are open.

Compared with the prior art, the technical proposal of the invention has the following beneficial effects:

1. The present invention provided a switching valve for discharging cold water in which the discharging cold state and the water outlet state are two separate states, and the discharging cold is not performed in the water outlet state, and the discharging cold is automatically performed in the closed state. So the hot water is flowing out at the beginning when the water is in the water outlet state, the traditional switching valve for discharging cold water is mostly drained at the same time of water outlet, so users still need to wait for some time before use.

2. The present invention provides a switching valve for discharging cold water, when the water inlet end is opened and the operating member is not switched to the shower mode, if the cold water in the water pipe has been completely discharged, the hot water in the water pipe is discharged out from the discharging cold passage. In order to avoid the waste of hot water, set the discharging cold blocker, so that when the flow through the discharging cold channel is hot water, the discharging cold blocker will block the discharging cold channel.

3. The present invention provides a switching valve for discharging cold water, if the operating member does not switch to a shower mode for a long period of time, then a very large amount of water is accumulated between the water inlet and the water stopping column, causing great water pressure, it is easy to damage the switching valve for discharging cold water. Therefore, the water stopping column is provided with a pressure hole in the direction of the water flow so that the water pressure in the cold water discharging passage is not excessively large, and protecting the switching valve for discharging cold water from being easily damaged.

4. The present invention provides a switching valve for discharging cold water, wherein the operating member is a spinning button, and when the button is pressed, the first switching member is moved from the first position to the second position with the button. The operating member is reset after the pressing is completed, and the first switching member is held in the second position by the water pressure in the water outlet passage, so that the switching valve for discharging cold water is kept in the water outlet state. When the water outlet is finished, the water pressure in the head water outflow passage disappears, and the first switching member is reset to the first position by the action of the first reset member, and the switching valve for discharging cold water is returned to the discharge cold position to cool the water, and realize to discharge cold when closing the water.

5. The present invention provides a switching valve for discharging cold water which is provided a second positioning groove so that when the operating member drives the first switching member to move, the positioning pin is moved from the first positioning groove into the second positioning groove and a stopper is released, suggesting the user that the discharge cold switching has been completed, it has a relatively strong operational direction. And the first positioning grooves are arranged at intervals in the direction of rotation so that the water outlet switching member also has a very clear stall in the switching process.

DETAILED DESCRIPTION OF THE PREFERRED EMBODIMENTS

The technical solutions of the present invention will be described in detail with reference to the accompanying drawings and embodiments.

Referring to FIGS. 1-5, a switching valve for discharging cold water, comprising: an operating member 1, a first switching member for discharging cold water 2, a water outlet switching member 3;

the switching valve for discharging cold water has a cold water discharging passage 10 and a head water outflow passage 20, when the operating member 1 is in the initial position, the first switching member 2 is located at the first position, a first joint 34 between the head water outflow passage 20 and the water inlet end 4 are sealed by the first switching member 2, the cold water discharging passage 10 is opened; when the operating member 1 is switched to the shower position, the first switching member 2 is moved by the operating member 1 to the second position, a second joint 35 between the cold water discharging passage 10 and the water inlet end 4 are sealed by the first switching member 2, and the head water outflow passage 20 is opened;

when the head water outflow passage 20 is opened, the operating member 1 is engaged with the water outlet switching member 3, and the operating member 1 is further operated to drive the movement of the water outlet switching member 3 so that a first water outlet passage 30 and a second water outlet passage are opened.

In the present embodiment, the switching valve for discharging cold water is connected to the shower system, and the first water outlet passage 30 and the second outlet passage are connected to the hand shower and the top shower respectively. Therefore, the above-mentioned switching valve for discharging cold water has two separate states, one is the discharge cold state and the other is the water outlet state, and the discharge cold is not performed during the showering of the user, and after the shower is completed, the switching valve for discharging cold water automatically switch to the discharge cold state for discharging cold. So the hot water is flowing out at the beginning when the discharge cold switching is in the water outlet state, the traditional switching valve for discharging cold water is mostly drained at the same time of water outlet, so users still need to wait for some time before use.

The second reset member 11 abuts the operating member 1, and the second reset member 11 accumulates the elastic return force when the operating member is moved from the initial position to the use position. Therefore, when the user withdraws the force applied to the operating member, the operating member 1 is reset to the initial position by the action of the second resetting member 11 and is engaged with the water outlet switching member 3; and the operating member 1 is reset to the initial position, the first switching member 2 is held in the second position by the action of the water pressure of the head water outflow passage 20. This makes it possible to switch between the discharge cold position and the shower position, and when the water outlet is switched, the discharge cold switch valve remains in the shower position without being affected.

The specific structure: the first switching member 2 is a switching shaft, and one end thereof engaged with the operating member in one way, and the other end abuts the first reset member 21, and the operating member 1 drives the switching shaft to translate along the axis of the switch shaft, the first reset member 21 accumulates the elastic return force during the process of translating of the switching shaft, so that when the water is turned off, the water pressure in the head water outflow passage 20 disappears, and the first switching member 2 is reset to the first position by the return force of the first reset member 21, thereby achieving the purpose of automatically switching the switching valve for discharging cold water to the discharge cold state when the water is turned off.

The outer periphery of the switching shaft is provided a first seal ring 22, the second joint 35 between the cold water discharging passage 10 and the water inlet end 4 and the first joint 34 between the water outlet passage and the water inlet end 4 are located on the right side and the left side of the water inlet end 4, respectively; when the shaft is in the first position, the first seal ring 22 is located on the left side of the inlet end 4, the head water outflow passage 20 and the inlet end 4 are sealed and isolated, the head water outflow passage 20 is closed; and when the switching shaft is in the second position; the first seal ring 22 is translated to the right side of the inlet end 4, the cold water discharging passage 10 and the water outlet end 4 are sealed and isolated, the cold water discharging passage 10 is closed.

Figure 1:
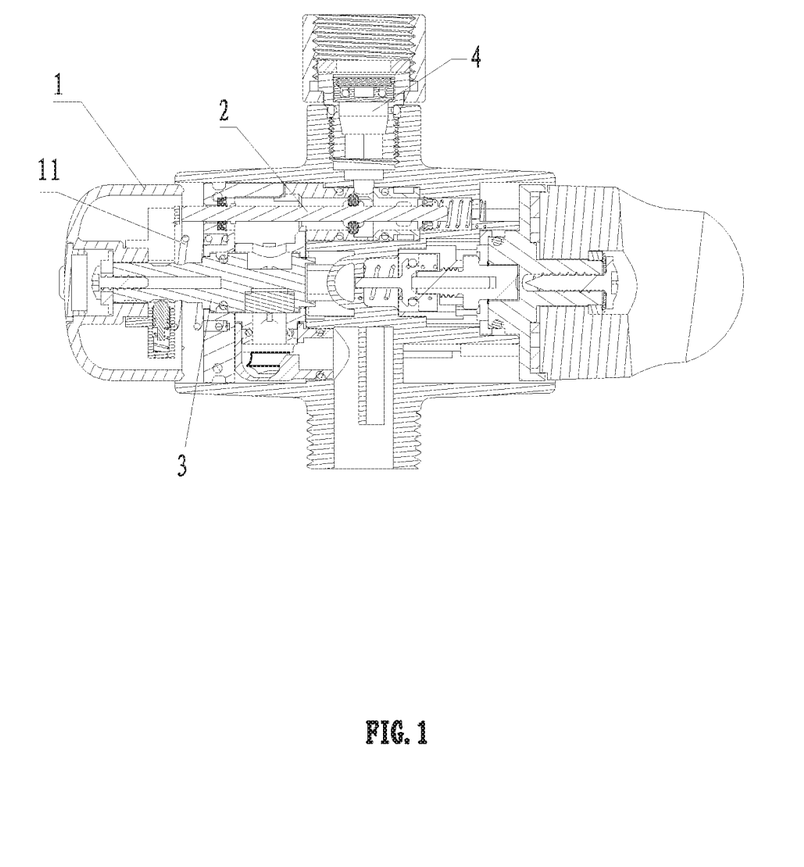
FIG. 1 is a cross-sectional view of the switching valve for discharging cold water in a discharge cold state in a preferred embodiment of the present invention.
Figure 2:
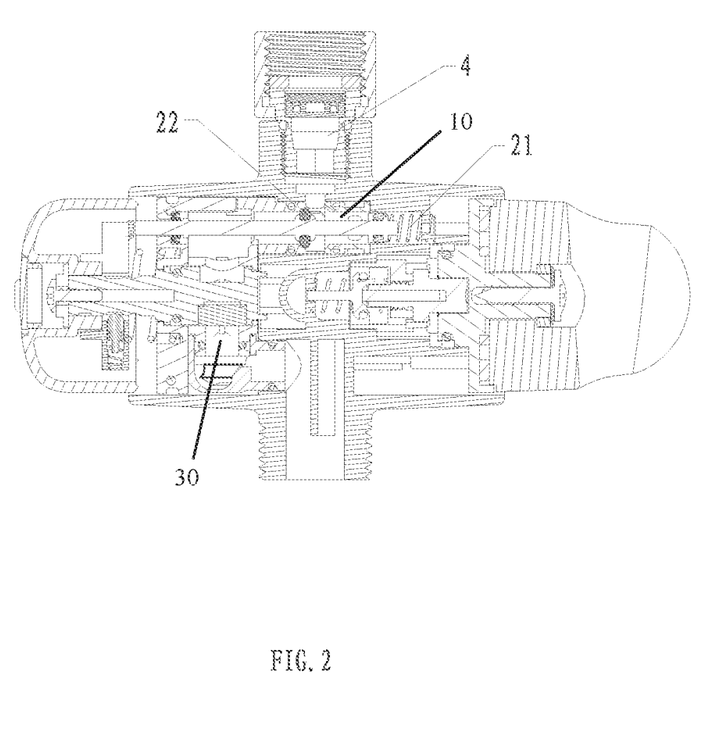
FIG. 2 is a schematic diagram of a water flow of the switching valve for discharging cold water in a discharge cold state in a preferred embodiment of the present invention.
Figure 3:
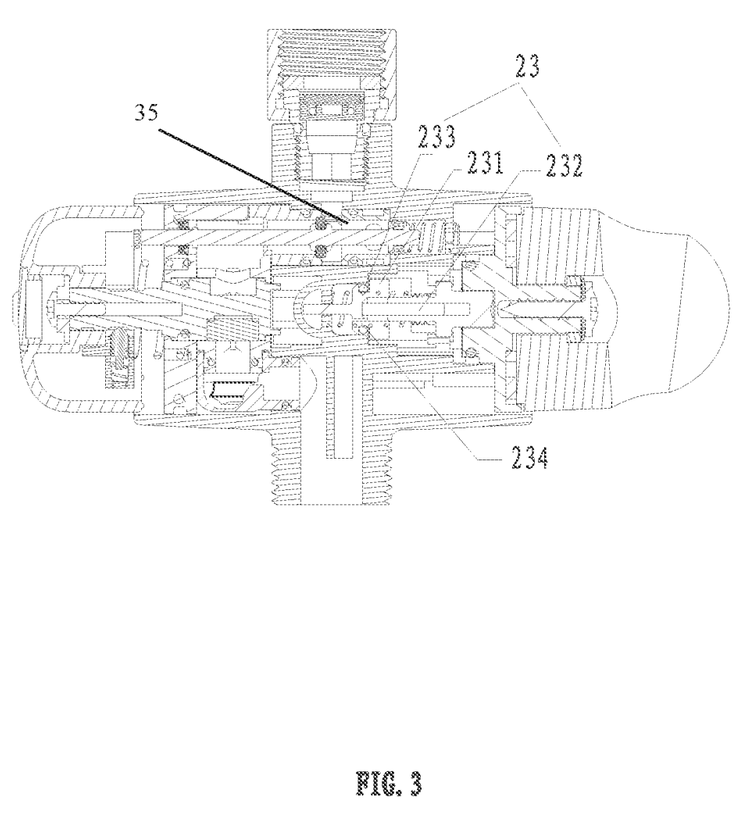
FIG. 3 is a cross-sectional view of the switching valve for discharging cold water when the hot water is blocked in the preferred embodiment of the present invention.

In addition, when the water inlet end 4 is opened and the operating member 1 is not switched to the shower mode, if the cold water in the water pipe has been completely discharged, the hot water in the water pipe flows out of the discharge cold passage. In order to avoid wasting hot water, the present embodiment also includes a discharge cold seal members 23 which include a water stopping column 231 and a temperature sensor 232 provided in the discharge cold passage, and the telescopic end of the temperature sensor 232 is engaged to the water stopping column 231, when the water flowing through the discharge cold passage is hot water, the telescopic end of the temperature sensor 232 is extended to translate the water stopping column 231; the second seal ring 233 provided on the water stopping column 231 seals the cold water discharging passage 10. At the same time, if the operating member 4 is not switched to the shower mode for a long time, the cold water discharging passage 10 will accumulate a large amount of water between the inlet end 4 and the water stopping column 231, causing a large amount of water pressure, easily damaging the switching valve for discharging cold water.

Therefore, in the present embodiment, the water stopping column 231 is provided with a pressure relief hole 234 in the direction of the water flow. When the water stopping column 231 seals the cold water discharging passage 10, the water in the cold water discharging passage 10 flow out through the pressure relief hole 234.

The above is the discharge cold principle and discharge cold process of the switching valve for discharging cold water in the discharge cold state. The water outlet state is further described below.

The operating member 1 is a spinning button, and the first switching member 2 is engaged to the spinning button in a pressing direction, and the water outlet switching member 3 is engaged to the spinning button in a rotational direction.

The water outlet member 3 is a valve rod having a third seal block 31 in the side wall, and the head water outflow passage 20 is communicated with the second water outlet passage and the first water outlet passage 30, respectively.

Figure 4:
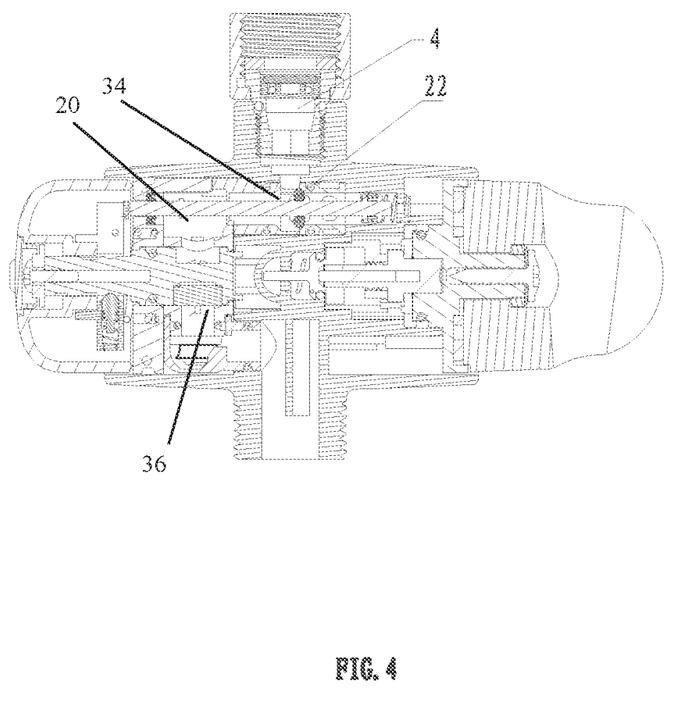
FIG. 4 is a cross-sectional view of the switching valve for discharging cold water in a shower state according to a preferred embodiment of the present invention.
Figure 5:
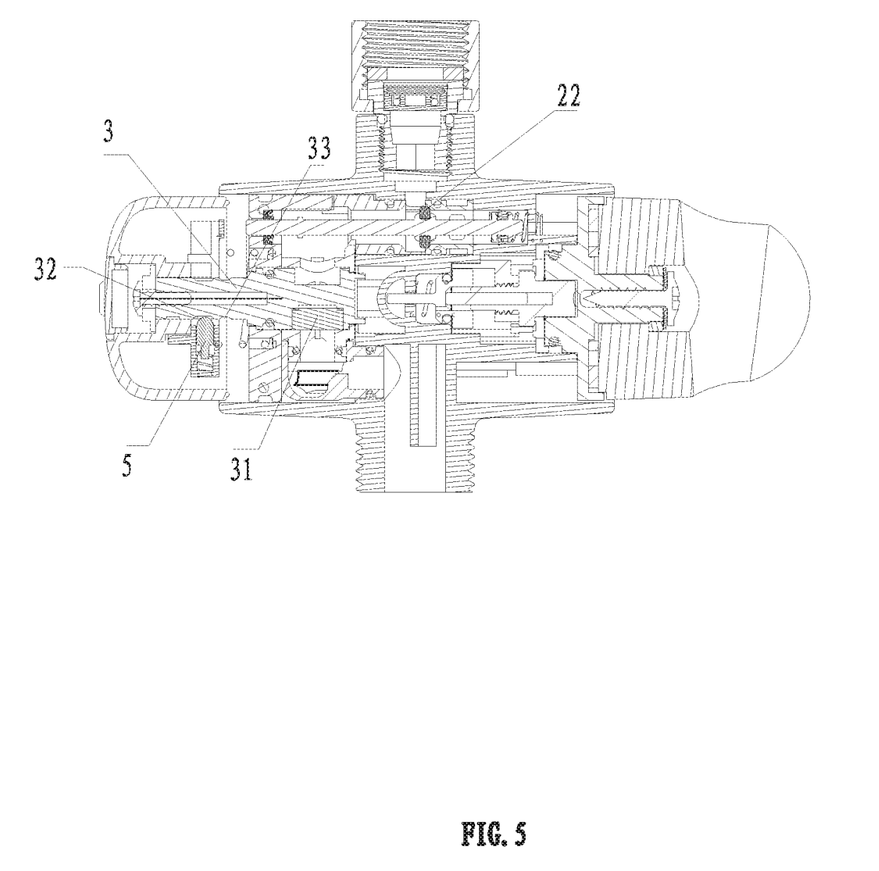
FIG. 5 is a cross-sectional diagram of the switching valve for discharging cold water in a shower state is present in the preferred embodiment of the present invention.

When the operating member 1 is pressed, the head water outflow passage 20 is opened. And then the operating member 1 is rotated so that the operating member 1 drives the valve rod rotate about the axial of the valve rod, when the third seal block 31 is rotated to seal a third joint 36 between the head water outflow passage 20 and the second water outlet passage or the first water outlet passage 30, the corresponding water outlet passage is blocked; and said second water outlet passage and said first water outlet passage 30 are simultaneously opened when said third seal block is rotated to another position. This will achieve the purpose of the water switching of water outlet way.

In addition, since the first switching member 2 is moved unidirectionally with the operating member 1 and the discharge cold state is smoothly switched to the shower state only when the first switching member is moved to a specific position, the operation of the user is required to provide directional assistance. In the present embodiment, the switching valve for discharging cold water is provided with a positioning pin 5, water outlet switching member is provided with a first positioning groove 32 and a second positioning groove 33 respectively in the pressing direction, and the operating member 1 is located at an initial position, the position pin 5 is matched with the first positioning groove 32; when the operating member 1 is in the use position, the positioning pin 5 is moved from the first positioning groove 32 to the second positioning groove 33 to thereby issue a flap to prompts the user that the discharge cold switching has been completed, so that the operation of the consumer can be prompted.

Further, the second positioning groove 33 covers the circumferential circle of the switching member 3 in the circumferential direction of the water outlet switching member 3, so pressing the spinning button can generate a voice prompt for switching in place, regardless of the rotation of the valve rod to an arbitrary position; the valve rod can rotates with the spinning button, in order to ensure that the positioning pin 5 can be positioned with the first positioning groove 32, the number of the first positioning groove 32 is three, provided along the circumference of the water outlet 3, so that the when the positioning pin 5 is engaged with the different first positioning groove 32, the second water outlet passage is opened or the first water outlet passage 30 is opened or the second water outlet passage and the first water outlet passage 30 are simultaneously opened. So that the operating member 1 has a clear sense of stalls in the process of driving the stem to rotate, the user operation is relatively clear. In actual use, if the number of the water outlet passage is three or more, the number of the second positioning grooves 33 corresponding thereto may be further increased, which is a simple replacement of the present embodiment.

In the present embodiment, there is provided a switching valve for discharging cold water having a degree of freedom of movement in two non-reciprocating directions, and when the spinning button is moved in the first direction, the switching valve for discharging cold water is switched from a discharge cold state to an outlet state; when the switching valve for discharging cold water is in the water outlet state, the operating member rotates in the second direction, the one or both of the first water outlet passage 30 and the second water outlet passage in the switching valve for discharging cold water are opened. So that the implementation of the cooling and water switch through the different directions of the action to be achieved separately, the range of motion is relatively strong.

The foregoing is intended to be a preferred embodiment of the present invention, but the scope of the invention is not limited thereto, and any person skilled in the art will be able to easily think of changes within the technical scope of the present invention or substitutions are to be covered within the scope of the present invention. Accordingly, the scope of protection of the present invention should be determined by the scope of the claims.

The invention claimed is:

1. A switching valve for discharging cold water, comprising:
   a water inlet end,
   an operating member,
   a first switching member for discharging the cold water,
   a water outlet switching member,
   a cold water discharging passage,
   a head water outflow passage, and
   a water outlet passage in fluid communication with the head water outflow passage, wherein:
      the operating member is operatively coupled to the first switching member,
      when the operating member is in an initial position:
         the first switching member is disposed at a first position,
         a first joint between the head water outflow passage and the water inlet end is sealed by the first switching member, and
         the cold water discharging passage is open, and when the operating member is switched from the initial position to a use position:
         the operating member is pushed to drive the first switching member to move to a second position,
         a second joint between the cold water discharging passage and the water inlet end is sealed by the first switching member,
         the head water outflow passage is opened,
         the operating member is operatively coupled to the water outlet switching member, and
         the operating member drives the water outlet switching member to rotate so that the water outlet passage is opened.

2. The switching valve for discharging cold water according to claim 1, wherein:
   when the operating member is reset from the use position to the initial position, the first switching member is maintained in the second position by a force of water in the head water outflow passage.

3. The switching valve for discharging cold water according to claim 2, wherein:
   the first switching member is a switching shaft,
   a first end of the switching shaft is operatively coupled to the operating member and a second end of the switching shaft abuts a first reset member,
   a circumference of the switching shaft is disposed with a first seal ring, and
   the operating member drives the switching shaft to move from the first position to the second position along its axial direction of the switching shaft.

4. The switching valve for discharging cold water according to claim 3, wherein:

the first joint and the second joint are respectively disposed on a first side and a second side of the water inlet end, when the switching shaft is in the first position, the first seal ring is disposed on the second side of the water inlet end, and when the switching shaft is in the second position, the first seal ring is switched to the first side of the water inlet end.

5. The switching valve for discharging cold water according to claim 1, further comprising:
a closing member, wherein:
the closing member comprises a water stopping column and a temperature sensor disposed in the cold water discharging passage,
a telescopic end of the temperature sensor is operatively coupled to the water stopping column, and
when hot water flows through the cold water discharging passage:
the telescopic end of the temperature sensor extends to drive the water stopping column to move, and
a second seal ring disposed on the water stopping column seals the cold water discharging passage.

6. The switching valve for discharging cold water according to claim 5, wherein:
the water stopping column comprises a pressure relief hole in a flowing direction of water, and
when the water stopping column seals the cold water discharging passage, the water in the cold water discharging passage flows out from the cold water discharging passage through the pressure relief hole.

7. The switching valve for discharging cold water according to claim 1, wherein when the head water outflow passage is opened, the operating member rotatably connects to the water outlet switching member.

8. The switching valve for discharging cold water according to claim 7, wherein:
the water outlet switching member is a valve rod,
a side wall of the valve rod is disposed with a third seal block,
the operating member drives the valve rod to rotate about an axial direction of the valve rod,
when the third seal block is rotated to a third joint between the head water outflow passage and the water outlet passage, the water outlet passage is blocked, and
when the third seal block is rotated to be away from the third joint, the water outlet passage is opened.

9. The switching valve for discharging cold water according to claim 1, wherein:
the operating member is a spinning button,
the first switching member is operatively coupled to the spinning button in a pressing direction of the spinning button, and
the water outlet switching member is rotatably connected to the spinning button.

10. The switching valve for discharging cold water according to claim 9, comprising:
a positioning pin, wherein:
the water outlet switching member comprises at least one first positioning groove and a second positioning groove in the pressing direction of the spinning button,
when the spinning button is pressed, the positioning pin is moved from the at least one first positioning groove to the second positioning groove, and
when the spinning button drives the water outlet switching member to rotate, the positioning pin is disposed in the at least one first positioning groove.

11. The switching valve for discharging cold water according to claim 10, wherein:
the second positioning groove is continuously disposed on an outer side of the water outlet switching member along a circumferential direction of the water outlet switching member,
the at least one first positioning groove comprises two first positioning grooves disposed on the outer side of the water outlet switching member along the circumferential direction of the water outlet switching member at intervals, and
when the positioning pin is engaged with a first one of the two first positioning grooves, the water outlet passage is open, and
when the positioning pin is engaged with a second one of the two first positioning grooves, the water outlet passage is closed.

12. A switching valve for discharging cold water, comprising:
an operating member,
a first switching member for discharging the cold water,
a water outlet switching member,
a cold water discharging passage,
a head water outflow passage,
a outlet water passage in fluid communication with the head water outflow passage, wherein:
the operating member is operatively coupled to the first switching member and the water outlet switching member,
the operating member is configured to be pressed to drive the first switching member to move from a first position for discharging the cold water to a second position for showering, and
the operating member is configured to be rotated to drive the water outlet switching member to rotate so that the water outlet passage is opened.

* * * * *